C. L. Frink,

Globe Valve,

Nº 61,414.   Patented Jan. 22, 1867.

Witnesses:
Alx. F. Roberts.
P. M. Covington

Inventor:
C. L. Frink.
per Munn & Co
Attorneys.

United States Patent Office.

C. L. FRINK, OF ROCKVILLE, CONNECTICUT.

*Letters Patent No. 61,414, dated January 22, 1867.*

IMPROVEMENT IN GLOBE-VALVES.

*The Schedule referred to in these Letters Patent and making part of the same.*

TO ALL WHOM IT MAY CONCERN:

Be it known that I, C. L. FRINK, of Rockville, in the county of Tolland, and State of Connecticut, have invented a new and useful Improvement in Globe-Valves; and I do hereby declare that the following is a full, clear, and exact description thereof.

My invention consists in a peculiar disk, by which I am enabled to hold the elastic packing in globe or other valves in place.

And to enable others skilled in the art to make and use my invention, I will proceed to describe its construction and operation, reference being had to the accompanying drawings, which form a part of this specification, and to the letters of reference marked thereon.

Figure 1:
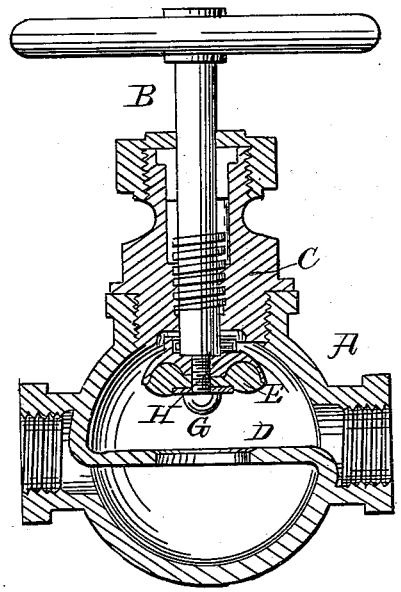

The drawing represents a longitudinal section of the cock in Figure 1; and

Figure 2:

Figure 2 is a plan or top view of my new disk.

Similar letters indicate like parts.

A represents the shell of the cock. B, the valve-stem with the screw. C, the female screw or nut. D, the valve-seat. E, the elastic packing. F is a clamping-plate. G is a screw which enters the end of the stem and holds the clamping-plate. H is the disk which holds the elastic packing in place. The disk H is attached to the stem B by a pin which is fast in the stem, and which works in a groove made in the hole through the collar of the disk. The stem rotates or turns freely in the disk while the disk keeps its position. It has been found that in all valves of this description the elastic packing is liable to become displaced and rendered nearly useless after a certain period of time, making it necessary to renew the packing, thereby causing expense and delay. To overcome this difficulty, I have invented and applied the peculiar-shaped disk H, as shown in the drawing. This disk is held in position, as before stated, by the loose attachment to the valve-rod. The under side of the disk is formed as represented in the drawing, the edges or lip of which enclose the elastic packing, and prevent its spreading or displacement. The clamping-plate F is forced against the packing by the screw G, and this forces the packing into the recess in the disk, as seen in the drawing, thus keeping it in place while it adjusts itself to the valve-seat D.

Having thus described my invention, what I claim as new, and desire to secure by Letters Patent, is—

The attachment of the disk H to the stem B, by means of the pin which is fast in the stem, and working in a groove in the disk, as herein shown and described.

The above specification of my invention signed by me this 20th day of September, 1866.

C. L. FRINK.

Witnesses:
B. H. BILL,
E. J. SMITH.